United States Patent
Choi et al.

(10) Patent No.: US 6,809,641 B2
(45) Date of Patent: Oct. 26, 2004

(54) METHOD FOR DISABLING ALARM TEMPORARILY IN MOBILE COMMUNICATION TERMINAL

(75) Inventors: Cham-A Choi, Seoul (KR); Hee-Jung Lee, Seoul (KR)

(73) Assignee: S. K. Teletec. Co., Ltd., Seoul (KR)

( * ) Notice: Subject to any disclaimer, the term of this patent is extended or adjusted under 35 U.S.C. 154(b) by 104 days.

(21) Appl. No.: 10/194,038

(22) Filed: Jul. 11, 2002

(65) Prior Publication Data

US 2003/0025592 A1 Feb. 6, 2003

(30) Foreign Application Priority Data

Jul. 12, 2001 (KR) ........................................ 2001-41909

(51) Int. Cl.[7] ............................. G08B 1/00; H04M 3/00
(52) U.S. Cl. .................. 340/501; 340/309.16; 340/7.2; 340/7.31; 455/412.2; 368/244; 705/9
(58) Field of Search ............................. 340/309.15, 7.2, 340/7.28, 7.31, 7.55, 501; 455/418, 412.1, 412.2; 368/89, 94, 244, 243; 341/22, 23; 705/9

(56) References Cited

U.S. PATENT DOCUMENTS

2002/0163592 A1 * 11/2002 Ueda .......................... 348/602

* cited by examiner

*Primary Examiner*—Donnie L. Crosland
(74) *Attorney, Agent, or Firm*—Morgan & Finnegan, L.L.P.

(57) ABSTRACT

A method for disabling temporarily preset alarm in a mobile communication terminal for one day, or periodically, or on a designated date, as a user wishes, is disclosed. The method comprises determining whether the temporal disabling button has been pushed by a user while the mobile communication terminal is in receive wait mode, and temporarily disabling the alarm upon pushing the temporal disabling button by the user. The method further comprises determining whether the temporal disabling menu button has been pushed by a user while the mobile communication terminal is in receive wait mode, displaying the temporal disabling menu items upon pushing of the temporal disabling menu button by the user, and temporarily disabling the alarm of the date designated by the corresponding menu item based on the temporal disabling menu item selected by the user.

13 Claims, 5 Drawing Sheets

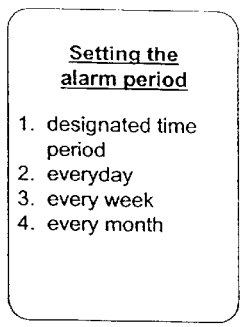
FIG. 1A
PRIOR ART
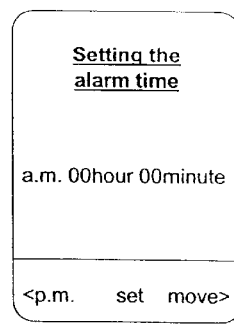
FIG. 1B
PRIOR ART
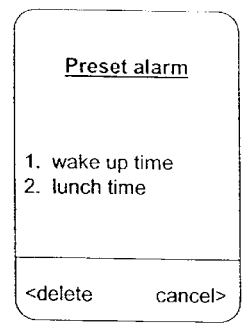
FIG. 1C
PRIOR ART
FIG. 2
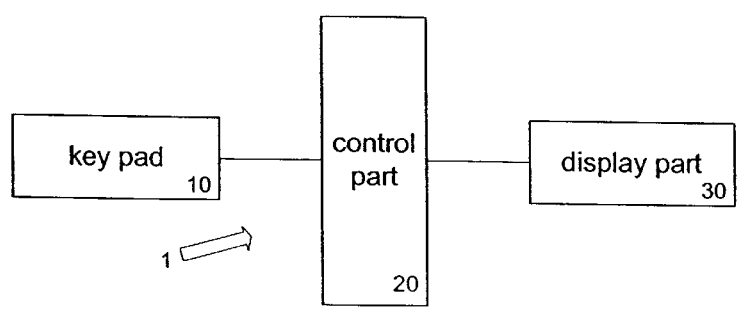

METHOD FOR DISABLING ALARM TEMPORARILY IN MOBILE COMMUNICATION TERMINAL

BACKGROUND OF THE INVENTION

1. Field of the Invention

The present invention relates to a method for temporarily disabling alarm settings in a mobile communication terminal, and more particularly, to a method for temporarily disabling alarm settings in a mobile communication terminal wherein a user is allowed to disable preset alarms periodically or for a desired period of time by manipulating certain buttons.

2. Description of the Prior Art

A mobile communication terminal generally comprises an alarm function, which releases an alarm at a time preset by a user. Further, some more recent mobile communication terminals allow users to set periodic alarms in addition to a simple alarm time, so that releasing an alarm for one single time, or repeating the alarm every day, every week, every month, etc. are possible.

FIGS. 1A through 1C illustrate an example of alarm setting in a mobile communication terminal in accordance with the conventional method, wherein FIG. 1A illustrates a menu screen for determining the period of an alarm, FIG. 1B illustrates a screen for alarm time setting, and FIG. 1C contains information on the preset alarm, whereby the user is allowed to input a time for the alarm after setting of the alarm has been completed. Here, the screens for alarm setting as exemplified in FIGS. 1A through 1C can vary from mobile communication terminal to mobile communication terminal, and a multiple alarm can also be set. Further, if a user selects a period e.g. 'every week' or 'every month' in FIG. 1A, a further screen can be provided to allow the user to additionally input a weekday or a day of the month, respectively.

However, most people living in modern society have a routine living cycle determined by a week, wherein the living cycle of the weekdays differs considerably from that of the weekend. For example, students or employees usually have to get up early in the morning during the weekdays to get to schools or jobs in time, while they may stay longer in bed on weekends, while some other office workers may have their work off every other Saturday.

Accordingly, once a student or an employee has set an alarm at a time early in the morning, for example, school or job, respectively, in a manner described in FIG. 1, the student or the employee has to get up and terminate the alarm every weekend or every other Saturday, when the alarm is released at the preset time, which procedure is bothersome.

While the alarm is disabled for the weekend to remove the above inconvenience, the alarm needs to be reset for the weekdays of the next week, so that the alarm setting-disabling-resetting cycle has to be repeated over the weekdays and weekends. Even at a mobile communication terminal that allows setting of multiple alarms for separate weekdays, setting of different alarm times for each weekday in a mobile communication terminal is necessary, which procedure is time-consuming and troublesome.

SUMMARY OF THE INVENTION

Accordingly, the present invention, conceived to solve the aforementioned problems, aims to provide a method for disabling temporarily a preset alarm in a mobile communication terminal for one day, or periodically, or on a designated date.

It is another objective of the present invention, to provide a method for disabling temporarily a preset alarm in a mobile communication terminal, comprising a disabling button, which disables temporarily an alarm allowed to be disabled temporarily in advance via manipulation of the above button by a user.

It is still another objective of the present invention, to provide a method for disabling temporarily a preset alarm in a mobile communication terminal, comprising a disabling button, which disables temporarily a desired alarm among the preset alarms via manipulation of the above button by a user.

In order to achieve the above objectives, the present invention comprises the first step of determining whether the temporal disabling menu button has been pushed by a user while the mobile communication terminal is in receive wait mode, the second step of displaying items of the temporal disabling menu upon push of the temporal disabling menu button by the user, and the third step of temporarily disabling the alarm of the date designated by the corresponding menu item based on the temporal disabling menu item selected by the user.

Further, the present invention comprises the first step of determining whether the temporal disabling button has been pushed by a user while the mobile communication terminal is in receive wait mode, and the second step of temporarily disabling an alarm upon push of the temporal disabling button by the user.

BRIEF DESCRIPTION OF THE DRAWINGS

FIGS. 1A–1C illustrate an example of alarm setting in a mobile communication terminal in accordance with a conventional method.

FIG. 2 shows a construction of a mobile communication terminal to which a method for disabling temporarily a preset alarm in a mobile communication terminal in accordance with the present invention applies.

DESCRIPTION OF THE PREFERRED EMBODIMENTS

A description of the preferred embodiments of the present invention is given below making reference to the accompanying drawings, for a more clear understanding of the present invention.

One construction of the mobile communication terminal to which the present method for disabling temporarily an alarm is shown in FIG. 2.

The mobile communication terminal 1 in FIG. 2 comprises a keypad 10 for inputting a user's command ordering to temporarily disable an alarm in a mobile communication terminal, a control part 20 for temporarily disabling an alarm stored in the mobile communication terminal by manipulation of the user, and a display part 30 for displaying temporal disabling menu items or certain alarm information by control of the control part 20.

The keypad 10 comprises at least the temporal disabling menu button for viewing the temporal disabling menu items or the temporal disabling button for temporarily disabling certain alarm, and may also comprise both at the same time. The keypad 10 further comprises a direction key button for searching menu items as well as a number button for input of time information.

The control part 20 displays the temporal disabling menu items upon manipulation of the temporal disabling menu button by the user, and disables temporarily a certain alarm of a date based on the user's selection of a temporal disabling menu item. Further, the control part 20 displays certain alarm information based on the manipulation of the temporal disabling button by the user and then disables temporarily the alarm selected by the user. In addition, the control part 20 disables temporarily an alarm allowed to be disabled temporarily based on manipulation of the temporal disabling button by the user. Here, whether or not an alarm is allowed to be temporarily disabled, is determined by whether or not the user has inputted the alarm as one that is allowed to be temporarily disabled.

The display part 30 displays the temporal disabling menu items or certain information on the alarm allowed to be temporarily disabled, and displays a message notifying the temporal disabling of a certain alarm if the alarm has been temporarily disabled, by control of the control part 20.

A detailed description of the first example of the preferred embodiments of the present invention is given below, making reference to FIGS. 3 and 5.

Figure 3:
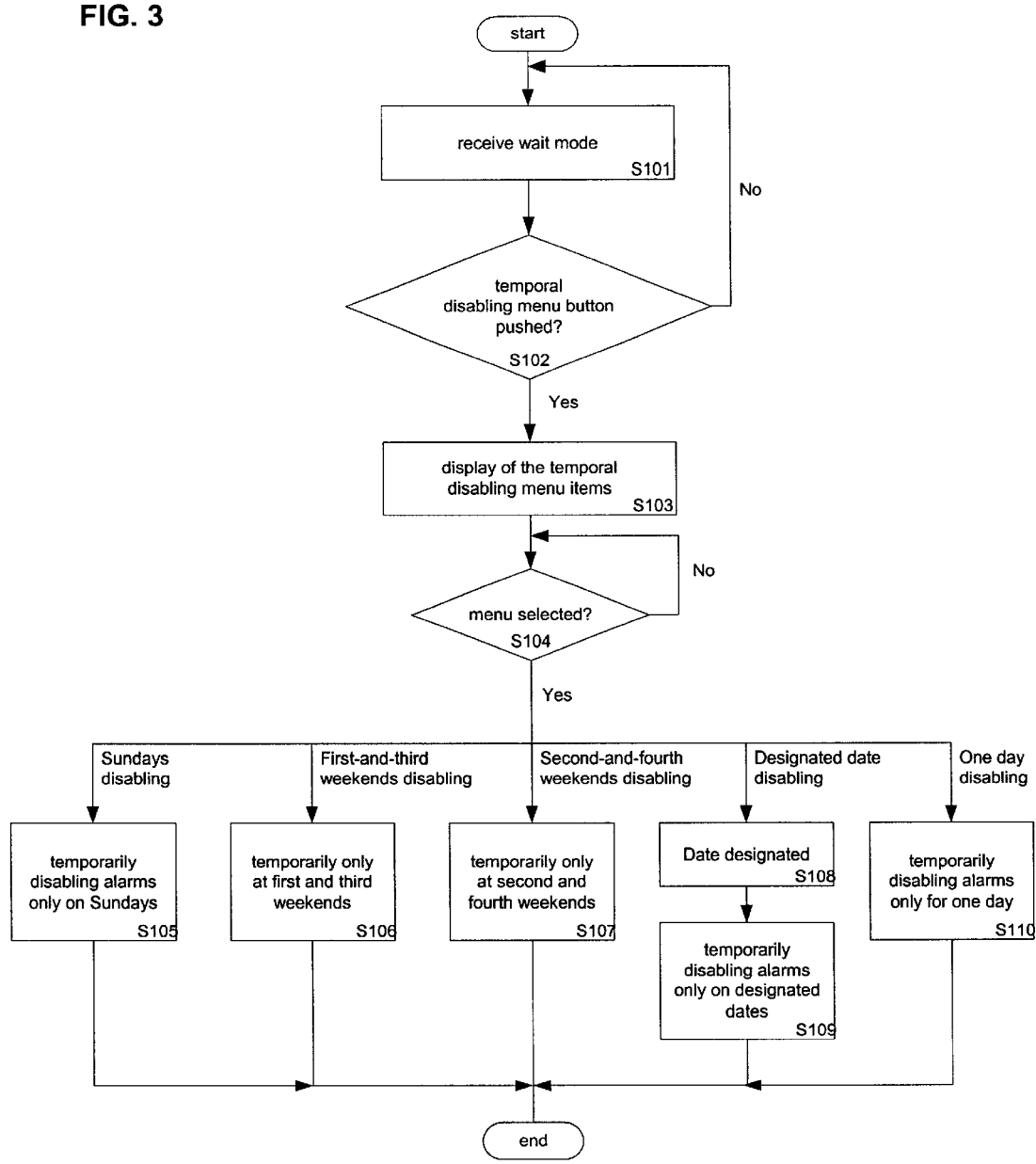
FIG. 3 is a flowchart showing the process of temporarily disabling an alarm in a mobile communication terminal via a temporal disabling menu in accordance with the present invention.

FIG. 3 is a flowchart showing the process of temporarily disabling an alarm in a mobile communication terminal via a temporal disabling menu in accordance with the present invention, while FIG. 5 exemplifies a process of temporarily disabling an alarm in a mobile communication terminal via a temporal disabling menu in accordance with the present invention.

There are two methods under the present invention for temporarily disabling an alarm in a mobile communication terminal: the reserved disabling method via a temporal disabling menu and the immediate disabling method via a temporal disabling button, which method can selectively be set by the needs of the manufacturer during the process of manufacturing a mobile communication terminal. First, the method of temporarily disabling an alarm setting in a mobile communication terminal using a temporal disabling menu is described below.

The first example of a preferred embodiment of the present invention is the process of temporarily disabling an alarm using a temporal disabling menu.

In the first embodiment example, the control part 20 determines in the receive wait mode (S101) of the mobile communication terminal whether the temporal disabling menu button has been pushed by a user (S102) as shown in FIG. 3. Here, the temporal disabling menu button may be provided either separately at the keypad 10 of the mobile communication terminal, or included in function menu so that it can be searched using an existing menu button step by step.

Figure 5A:
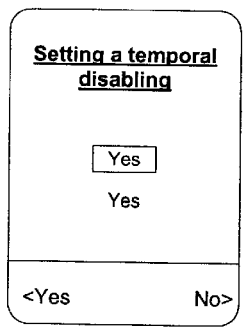
FIGS. 5A–5C exemplify a process of temporarily disabling an alarm in a mobile communication terminal via a temporal disabling menu in accordance with the present invention.
Figure 5B:
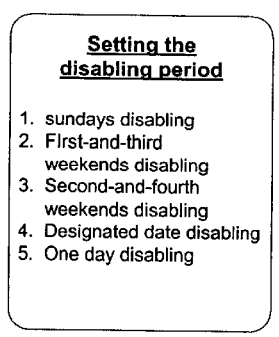

Upon pushing of the temporal disabling menu button by a user, the control part 20 (FIG. 2) displays the temporal disabling menu items (S103) on the display part 30. At this time, a screen inquiring whether or not the user wants to use a temporal disabling feature as shown in FIG. 5A is first displayed, whereupon the user confirms by clicking the 'YES' button if the user wants to proceed to temporarily disable the alarm, and subsequently, the menu items are displayed. The temporal disabling menu may comprise items such as 'Sundays disabling', 'First and third weekends disabling', 'Second and fourth weekends disabling', 'Designated date disabling', 'One day disabling' as shown in FIG. 5B.

Then, the user selects one among the menu items displayed on the display part 30 (S104) (FIG. 3).

Figure 5C:
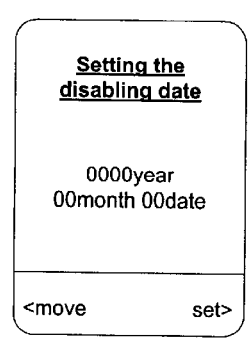

Upon selection of 'Sundays disabling' by the user, the alarm will be disabled only on Sundays (S105); upon selection of 'First and third weekends', it will be disabled at the first and third weekends (S106); upon selection of 'Second and fourth weekends', it will be disabled at the second and fourth weekends (S107); while the alarm will be disabled only for a date designated by the user (S109), in case the user has selected 'Designated date disabling' among the menu items and then designated a date on a screen as in FIG. 5C (S108). In addition, if the user selects 'One day disabling', the alarm will be disabled for 24 hours from the time of selection of 'One day disabling' (S110).

Although all the relevant alarms are disabled in the course of the steps S105 through S110 upon selection of the temporal disabling menu items by the user at step S104, further steps of displaying a list of preset alarms on the display part 30 and of selecting the alarms to be temporarily disabled from the above list of alarms displayed on the display part 30 by the user may be added after or prior to the steps of S105 through S110. In such latter case, only those alarms selected by the user will be temporarily disabled.

Furthermore, though not shown in FIG. 3, if the user determines in advance whether each alarm is allowed to be temporarily disabled via an alarm setting menu, only those alarms allowed to be disabled will be temporarily disabled, when the user selects a temporal disabling menu item displayed on the display part 30 at steps S105 through S110. Here, the control part 20 controls the display part 30 (FIG. 2) to display a menu for determining whether each alarm is allowed to be temporarily disabled, receives selection of the user, stores the same together with the corresponding alarm information in a predetermined memory, and effects temporal disabling of the alarm based on the manipulation of the user.

Now, a detailed description of a second example of a preferred embodiment of the present invention is given below, making reference to FIG. 4, and FIGS. 6 through 8.

The second example of preferred embodiments of the present invention describes the process of temporarily disabling an alarm using a temporal disabling button.

Figure 4:
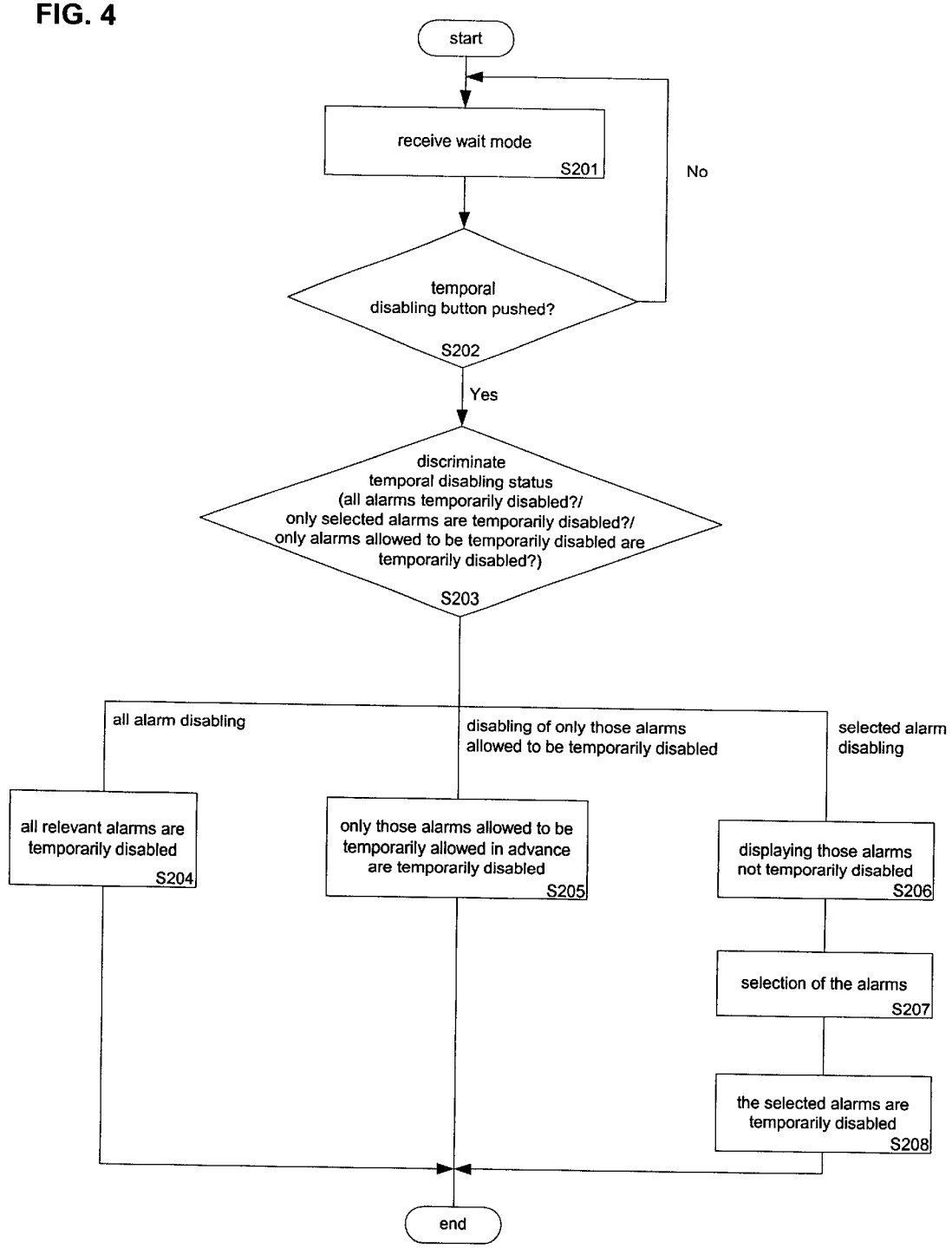
FIG. 4 is a flowchart showing the process of temporarily disabling an alarm in a mobile communication terminal via a temporal disabling button in accordance with the present invention.

In the second embodiment example, the control part 20 determines in the receive wait mode (S201) of the mobile communication terminal whether the temporal disabling button has been pushed by a user (S202) as shown in FIG. 4. Here, the temporal disabling button may be provided either separately at the existing keypad 10 (FIG. 2), or may be integrated to function by a long push on an existing keypad 10. Further, the temporal disabling button can also be used for recovering the alarm from the temporal disablement after a temporal disabling has been effected.

Upon pushing of the temporal disabling button, the control part 20 operates differently in accordance with the temporal disabling status set in a mobile communication terminal (S203).

Figures 6A, 6B:
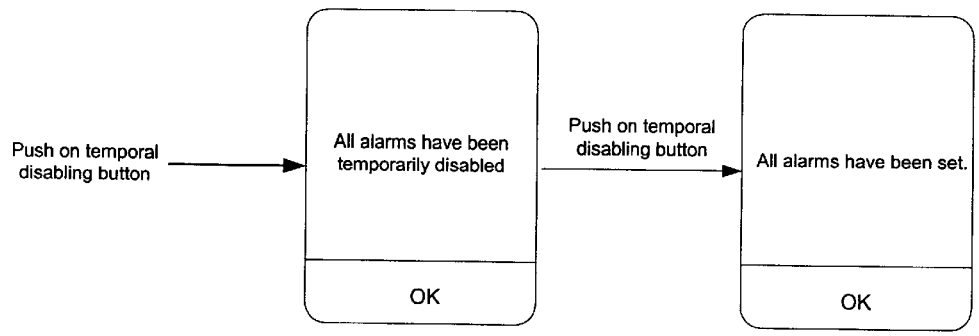
FIGS. 6A, 6B, FIGS. 7A, 7B and FIGS. 8A, 8B, 8C, 8D exemplify processes of temporal disabling an alarm in a mobile communication terminal via a temporal disabling button in accordance with the present invention.

In case the temporal disabling setting in a mobile communication terminal is set to disable all relevant alarms upon pushing of the temporal disabling button, the control part 20 (FIG. 2) disables all the relevant alarms upon sensing that the temporal disabling button has been pushed, and displays a message notifying that all relevant alarms have temporarily been disabled as shown in FIG. 6A (S204). If the temporarily disabled alarms shall be recovered, i.e. if the temporal disablement of all relevant alarms is to be cancelled, the temporal disabling button on the keypad 10 needs to be pushed anew so that a status as shown in FIG. 6B is restored.

Figures 7A, 7B:
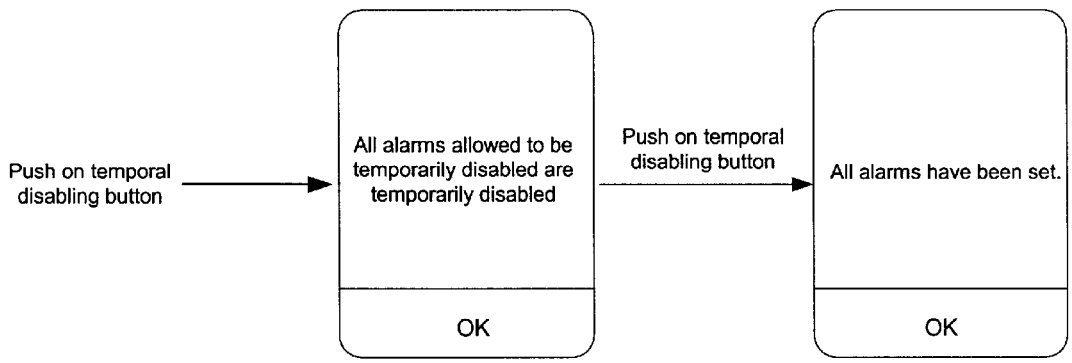

Further, in case the temporal disabling setting in a mobile communication terminal is set to disable only those alarms allowed to be disabled temporarily upon push of the temporal disabling button, the control part 20 disables only those alarms that are allowed to be temporarily disabled upon sensing that the temporal disabling button has been pushed, and displays a message notifying that only those alarms allowed to be temporarily disabled have temporarily been disabled as shown in FIG. 7A (S205). If the temporarily disabled alarms shall be recovered, i.e. if the temporal disablement of relevant alarms shall be cancelled, the temporal disabling button on the keypad 10 needs to be pushed anew so that a status as shown in FIG. 7B is restored. Here, the above alarm can be one or more in number. The user determines whether or not an alarm is allowed to be temporarily disabled by selecting a temporal disabling allowance setting menu via the alarm setting menu at the time of or after setting of the alarm, whereby the control part 20 displays the above menu for selection on the display part 30 and then receives the user's selection.

Figures 8A, 8B:
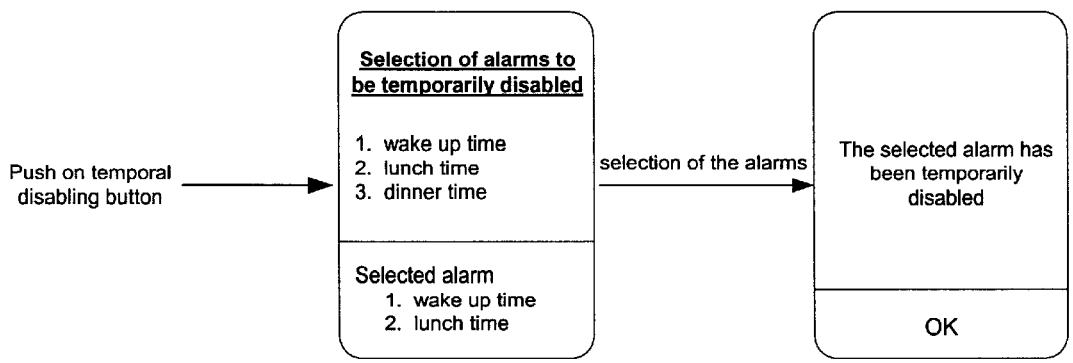

Furthermore, in case the temporal disabling setting in a mobile communication terminal is set to disable those alarms selected by the user upon pushing of the temporal disabling button, the control part 20 displays a list of alarms that are not temporarily disabled as shown in FIG. 8A (S206), whereupon the user selects those alarms from the list displayed that are to be temporarily disabled (S207). Then, the selected alarms are temporarily disabled, and a message as shown in FIG. 8B notifying that the selected alarms have temporarily been disabled is displayed (S208).

Figures 8C, 8D:
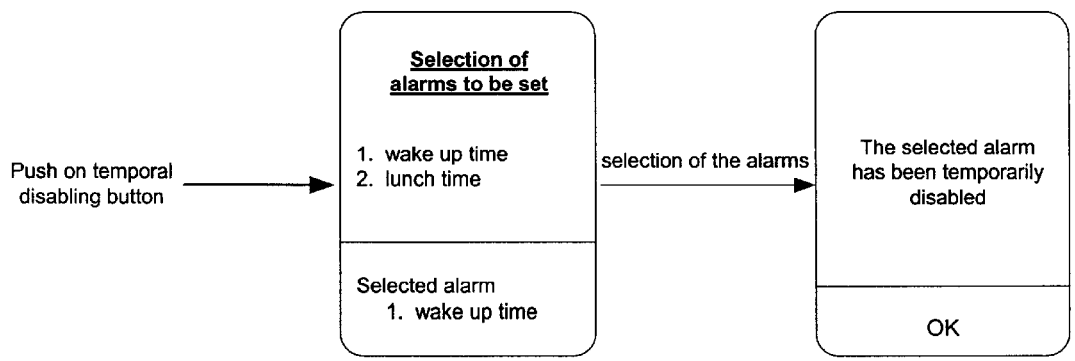

If the temporarily disabled alarms shall be recovered, the temporal disabling button on the keypad 10 needs to be pushed anew, whereupon the control part 20 displays a list of alarms temporarily disabled as shown in FIG. 8C on the display part 30, recovers the selected alarms as the user selects the alarms to be recovered, and displays a message notifying that the selected alarms have been recovered as shown in FIG. 8D. In the step of recovering the temporarily disabled alarms, a multiple selection of alarms are also allowed as in the above step S207.

Industrial Applicability

As described above, since the present invention allows a user to temporarily disable a preset alarm in a mobile communication terminal for only one single day, or periodically, or on a designated date as the user desires, those people having a fixed schedule pattern such as students or employees can be freed from the bothersome repeating of alarm setting and alarm canceling caused by any change in their everyday schedule patterns.

Further, since the present invention is capable of temporarily disabling preset alarms in a mobile communication terminal that are allowed in advance to be temporarily disabled by a user's manipulation of a button provided therefore, it allows the user to set in advance alarms he allows to be temporarily disabled, and then to temporarily disable only the desired alarms.

In addition, since the present invention is capable of temporarily disabling desired alarms in a mobile communication terminal among all preset alarms by a user's manipulation of a button provided therefore, it allows the user to temporarily disable only the desired alarms, if necessary.

Although the present invention has been described above with reference to several preferred embodiments, it should be noted that the present invention is not limited thereto, but rather, the scope of rights of the present invention shall be determined by the appended claims, allowing for various adaptations, modifications, and alterations without departing the scope and spirit of the present invention as those skilled in the art will understand.

What is claimed is:

1. A method for temporarily disabling an alarm in a mobile communication terminal comprising,
    the first step of determining whether a temporal disabling menu button has been pushed by a user while a mobile communication terminal is in receive wait mode;
    the second step of displaying temporal disabling menu items upon push of said temporal disabling menu button by said user; and
    the third step of temporarily disabling alarms of the date designated by the corresponding menu item upon selection of a temporal disabling menu item by said user.

2. The method for temporarily disabling an alarm in a mobile communication terminal as set forth in claim 1, wherein said temporal disabling menu item displayed upon pushing of said temporal disabling menu button comprises 'Sundays disabling', 'First and third weekends disabling', 'Second and fourth weekends disabling', 'Designated date disabling', or 'One day disabling'.

3. The method for temporarily disabling an alarm in a mobile communication terminal as set forth in claim 2, comprising an additional step of designating a date by the user, if said user has pushed said temporal disabling menu button and selected said item 'Designated date disabling' among said temporal disabling menu items.

4. The method for temporarily disabling an alarm in a mobile communication terminal as set forth in claim 1, wherein all preset alarms of a date designated by said menu item selected by said user at said third step are temporarily disabled.

5. The method for temporarily disabling an alarm in a mobile communication terminal as set forth in claim 2, wherein all preset alarms of a date designated by said menu item selected by said user at said third step are temporarily disabled.

6. The method for temporarily disabling an alarm in a mobile communication terminal as set forth in claim 3, wherein all preset alarms of a date designated by said menu item selected by said user at said third step are temporarily disabled.

7. The method for temporarily disabling an alarm in a mobile communication terminal as set forth in claim 1, wherein additional steps of displaying the preset alarms and of selecting alarms to be temporarily disabled among said displayed alarms by said user are included after said second step, and only those alarms allowed to be temporarily disabled in advance by said user are temporarily disabled in said third step.

8. The method for temporarily disabling an alarm in a mobile communication terminal as set forth in claim 2, wherein additional steps of displaying the preset alarms and of selecting alarms to be temporarily disabled among said displayed alarms by said user are included after said second step, and only those alarms allowed to be temporarily disabled in advance by said user are temporarily disabled in said third step.

9. The method for temporarily disabling an alarm in a mobile communication terminal as set forth in claim 3, wherein additional steps of displaying the preset alarms and of selecting alarms to be temporarily disabled among said displayed alarms by said user are included after said second step, and only those alarms allowed to be temporarily disabled in advance by said user are temporarily disabled in said third step.

10. A method for temporarily disabling an alarm in a mobile communication terminal comprising, the first step of confirming whether a temporal disabling button has been pushed by a user while a mobile communication terminal is in receive wait mode; and the second step of temporarily disabling the alarm upon pushing of said temporal disabling button by said user.

11. The method for temporarily disabling an alarm in a mobile communication terminal as set forth in claim 10, wherein all alarms are temporarily disabled at said second step upon pushing of said temporal disabling button by said user.

12. The method for temporarily disabling an alarm in a mobile communication terminal as set forth in claim 10, wherein only those alarms allowed to be temporarily disabled in advance by said user are temporarily disabled at said second step upon pushing of said temporal disabling button by said user.

13. The method for temporarily disabling an alarm in a mobile communication terminal as set forth in claim 10, wherein said second step comprises additional steps of:

displaying those alarms not temporarily disabled;

selecting by said user the alarms to be temporarily disabled among the alarms displayed at said displaying step; and temporarily disabling only those alarms selected by said user at said selecting step.

* * * * *